Jan. 26, 1937.  E. G. ROEHM ET AL  2,068,889
MILLING AND PROFILING MACHINE
Filed Sept. 11, 1935  10 Sheets-Sheet 1

INVENTOR.
ERWIN G. ROEHM
MILLARD ROMAINE
BY
ATTORNEY.

Jan. 26, 1937.   E. G. ROEHM ET AL   2,068,889
MILLING AND PROFILING MACHINE
Filed Sept. 11, 1935   10 Sheets-Sheet 3

INVENTOR.
ERWIN G. ROEHM
MILLARD ROMAINE
BY
AH Parsons
ATTORNEY.

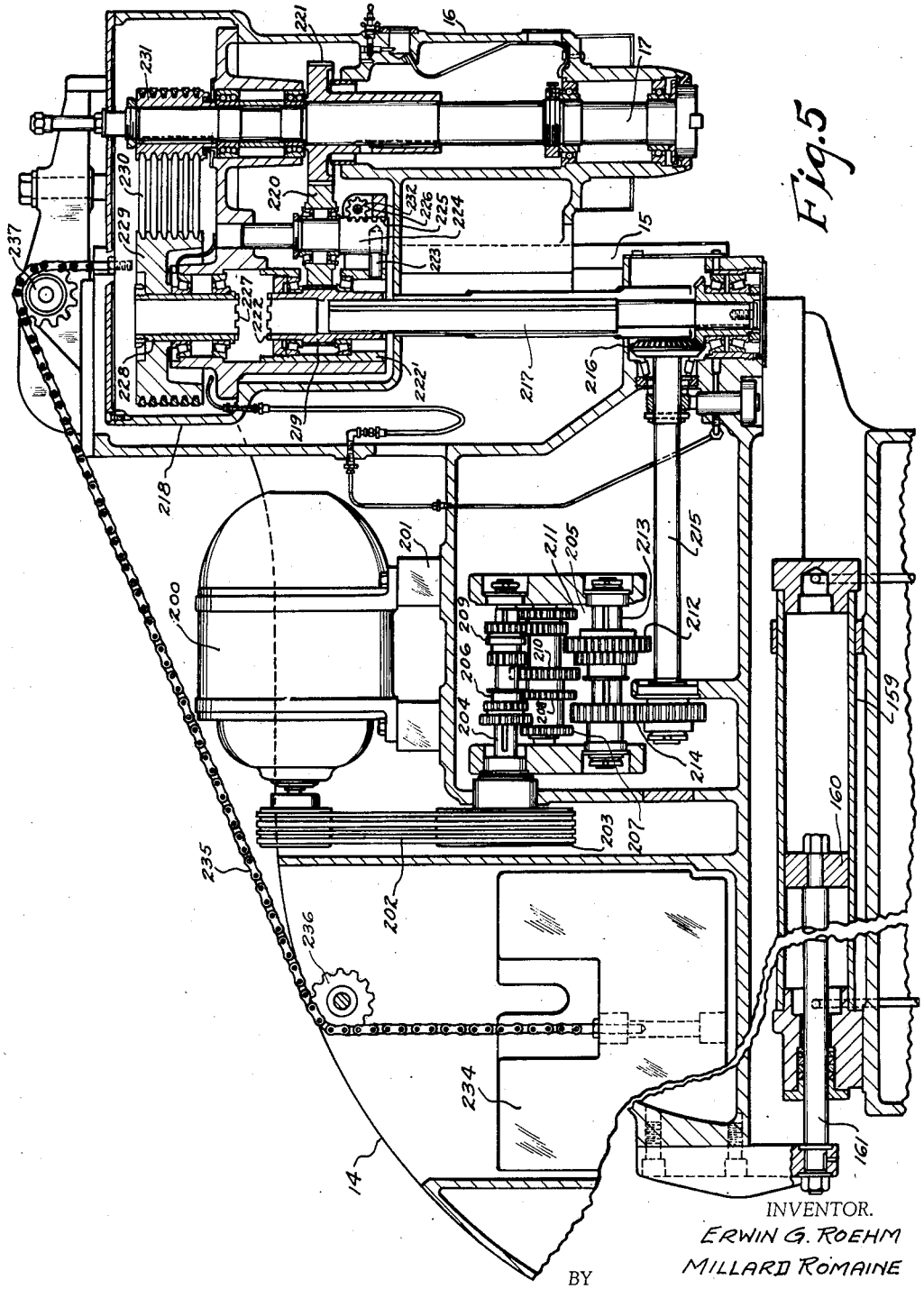

Jan. 26, 1937.  E. G. ROEHM ET AL  2,068,889
MILLING AND PROFILING MACHINE
Filed Sept. 11, 1935   10 Sheets-Sheet 6

INVENTOR.
ERWIN G. ROEHM
MILLARD ROMAINE
BY
*A. K. Parsons*
ATTORNEY.

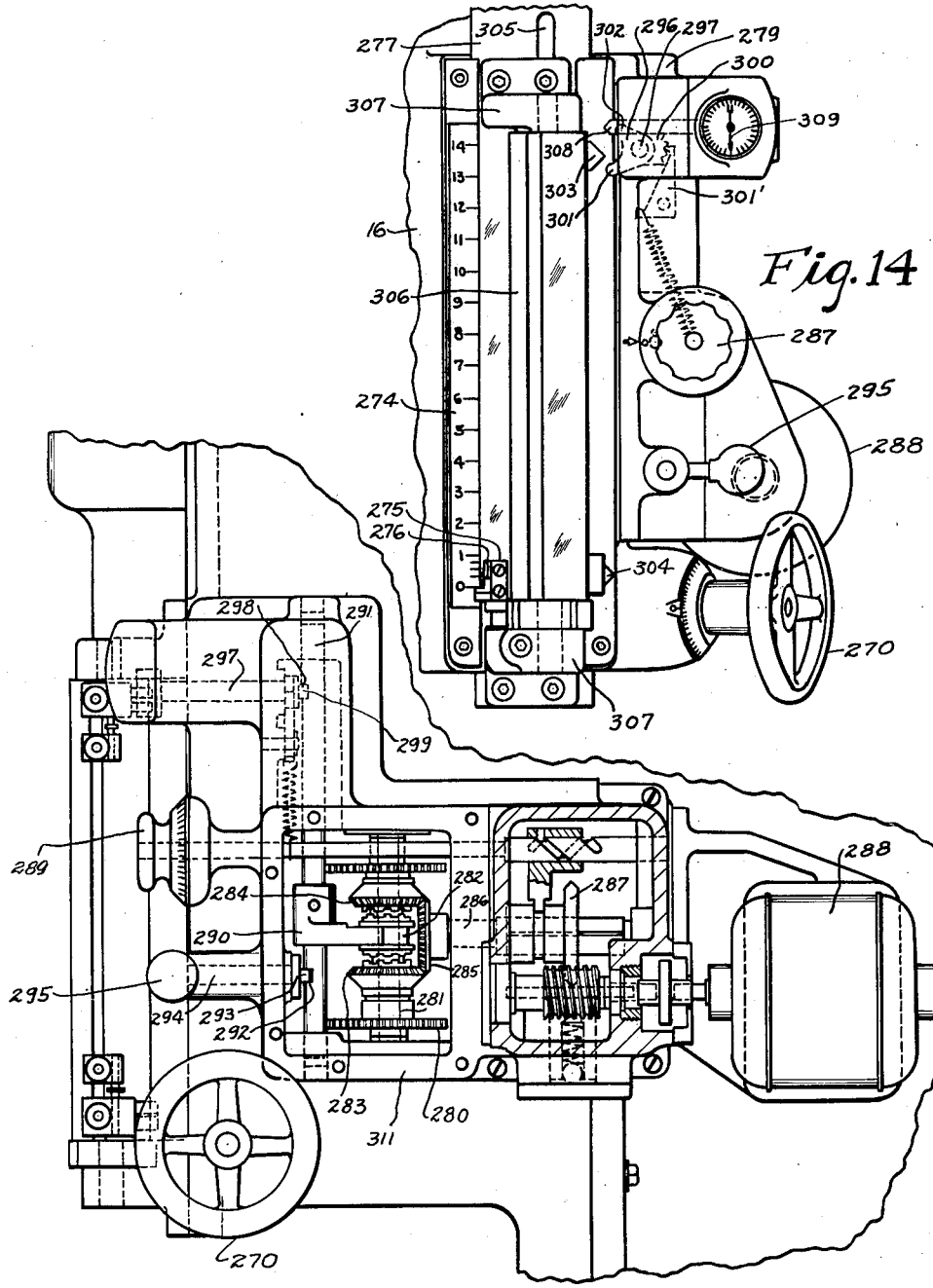

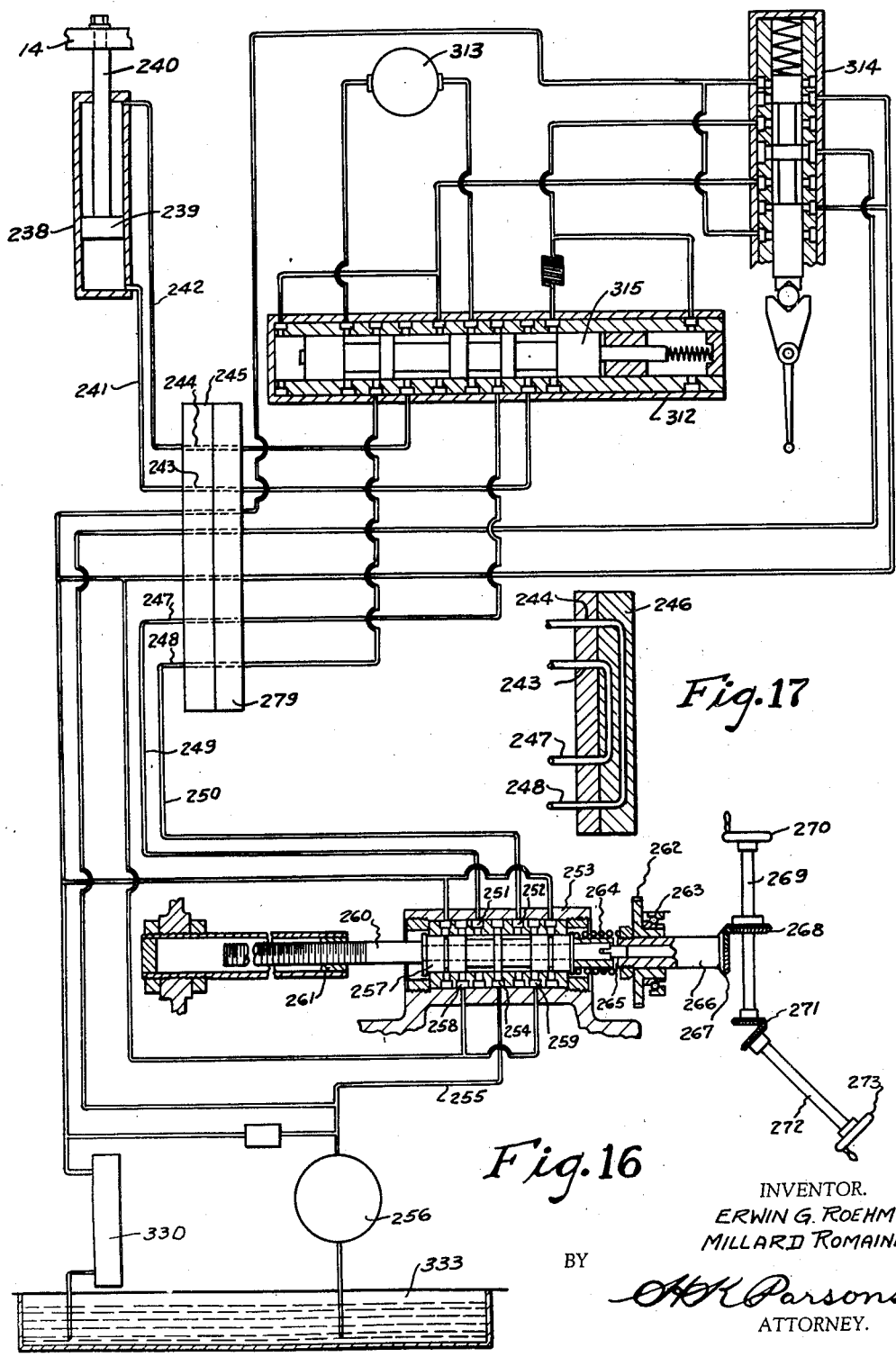

Jan. 26, 1937.  E. G. ROEHM ET AL  2,068,889
MILLING AND PROFILING MACHINE
Filed Sept. 11, 1935  10 Sheets-Sheet 10

INVENTOR.
ERWIN G. ROEHM
MILLARD ROMAINE
BY
A H Parsons
ATTORNEY.

Patented Jan. 26, 1937

2,068,889

UNITED STATES PATENT OFFICE 2,068,889

MILLING AND PROFILING MACHINE

Erwin G. Roehm, Norwood, and Millard Romaine, Cincinnati, Ohio, assignors to The Cincinnati Milling Machine Co., Cincinnati, Ohio, a corporation of Ohio Application September 11, 1935, Serial No. 40,060

18 Claims. (Cl. 90—13.5)

This invention relates to milling machines and more particularly to one that may be readily utilized for plain milling operations, or for profiling and die-sinking operations.

One of the objects of this invention is to provide a milling machine having three-directional manual or power control of relative movement between the tool support and work support by means of which plain milling operations may be performed, to which may be selectively added automatic tracer control of one of the directional movements whereby contouring operations may be performed.

Another object of this invention is to provide a plain milling machine having attachments whereby the same may be utilized for profiling or die-sinking purposes.

A further object of this invention is to provide a profiling machine in which a plate cam may be utilized to reproduce a surface much wider than the thickness of the plate but having the same profile as the cam.

An additional object of this invention is to provide in a profiling machine for relative movement between the tool and work in one lateral direction without changing the relative positions between the tracer and pattern in that direction.

Still another object of this invention is to provide a tracer controlled unit which may be selectively applied to plain milling machines for automatically controlling relative movement between the tool and work in one direction.

A still further object of this invention is to provide in a pattern controlled machine tool for three-directional adjustment of the tracer with respect to the tool of the machine.

Other objects and advantages of the present invention may be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 5 is a section through the ram as viewed on the line 5—5 of Figure 1 showing the spindle transmission.

Figure 14 is a detail view of the control mechanism for governing the position of the vertically movable slide.

Figure 15 is a section through the detachable power bracket for the vertically movable slide.

Figure 16 is a diagrammatic view of the spindle carrier control circuit and the connections to the tracer control circuit.

Figure 17 is a detail view of the removable plate which is applied when the tracer circuit is removed.

Figure 19 is a detail section taken on the line 19—19 of Figure 3.

Figure 20 is a section on the line 20—20 of Figure 19.

The machine of this invention has been designed for utilization as a plain milling machine, or as a tracer controlled profiling or die-sinking machine, and, to simplify the description, the construction and operation of the machine as a plain milling machine will be described first.

Figure 1:
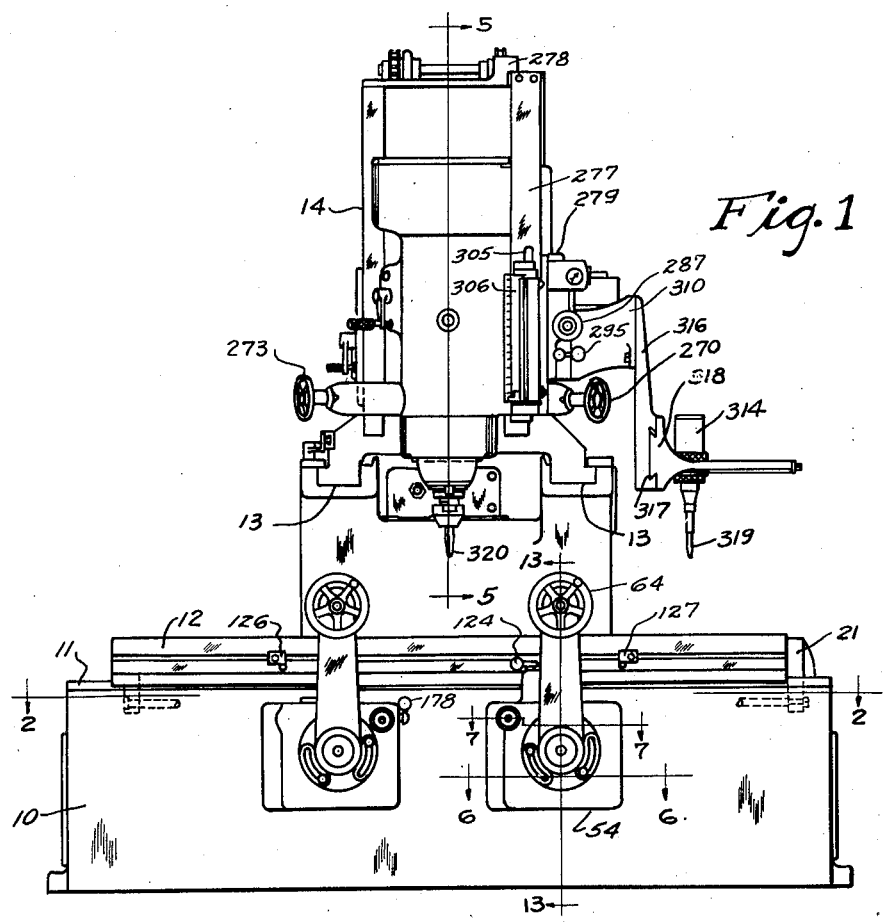
Figure 1 is a front elevation of a machine embodying the principles of this invention.
Figure 2:
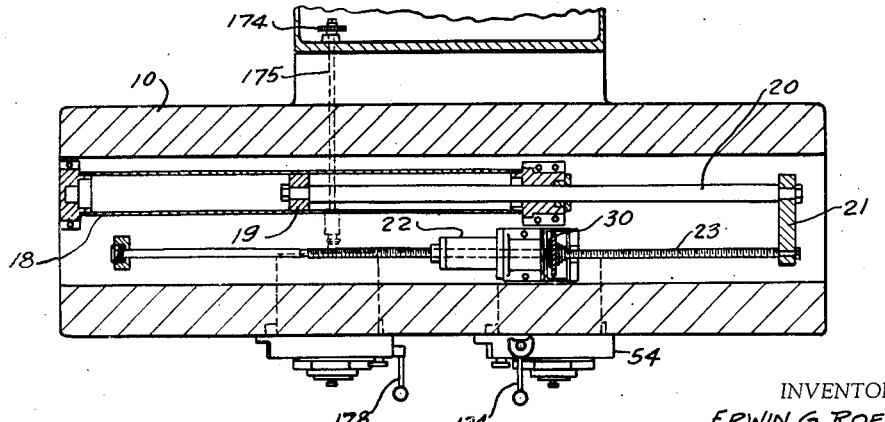
Figure 2 is a section through the bed of the machine shown in Figure 1 as viewed on the line 2—2 thereof.
Figure 3:
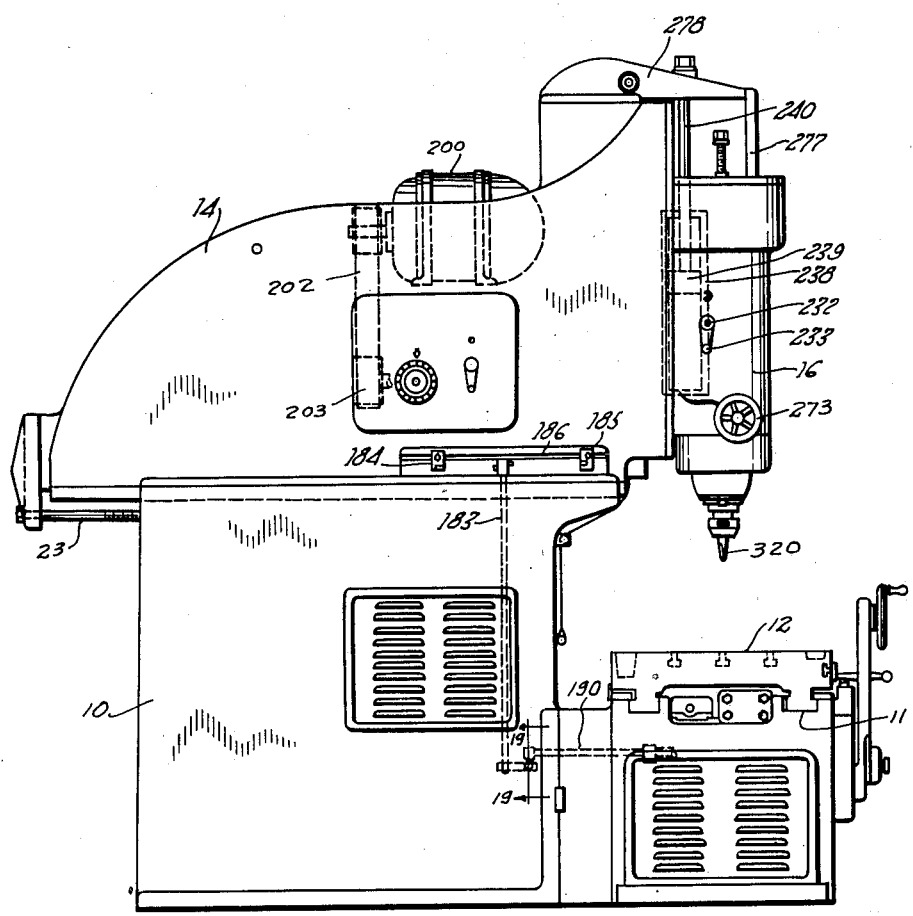
Figure 3 is an elevation of the machine shown in Figure 1 as viewed from the left of that figure.

As shown in Figures 1, 2 and 3 the machine comprises a bed unit 10 upon which is formed horizontal guideways 11 for receiving and guiding a work table 12. The bed unit also has formed thereon a pair of guideways 13 extending in a direction normal to the axis of the guide surfaces 11 upon which is mounted a ram 14 for relative movement with respect to the table 12.

As shown in Figure 5, one end of the ram has vertical guideways 15 formed thereon for receiving and guiding the vertically movable spindle carrier 16 in which is journaled the tool spindle 17. Each one of these movable units is provided with manual and power control means which will now be successively described.

The operating and control mechanism for the table is more particularly shown in Figures 1, 2, 6, 7, 8, 13 and 18. As shown in Figure 2, a cylinder 18 is secured in the bed 10, and it has a contained piston 19 which is connected by a piston rod 20 to a bracket 21 depending from one end of the table 12, whereby admission of fluid pressure to one end or the other of the cylinder will cause movement of the table.

The admission of fluid pressure to the cylinder is controlled by a servo-valve regardless of whether manual or power control is utilized.

As shown in Figure 2, the servo-valve is mounted in a housing 22, and a lead screw 23, which is attached to opposite ends of the table passes axially through this housing.

Figure 18:
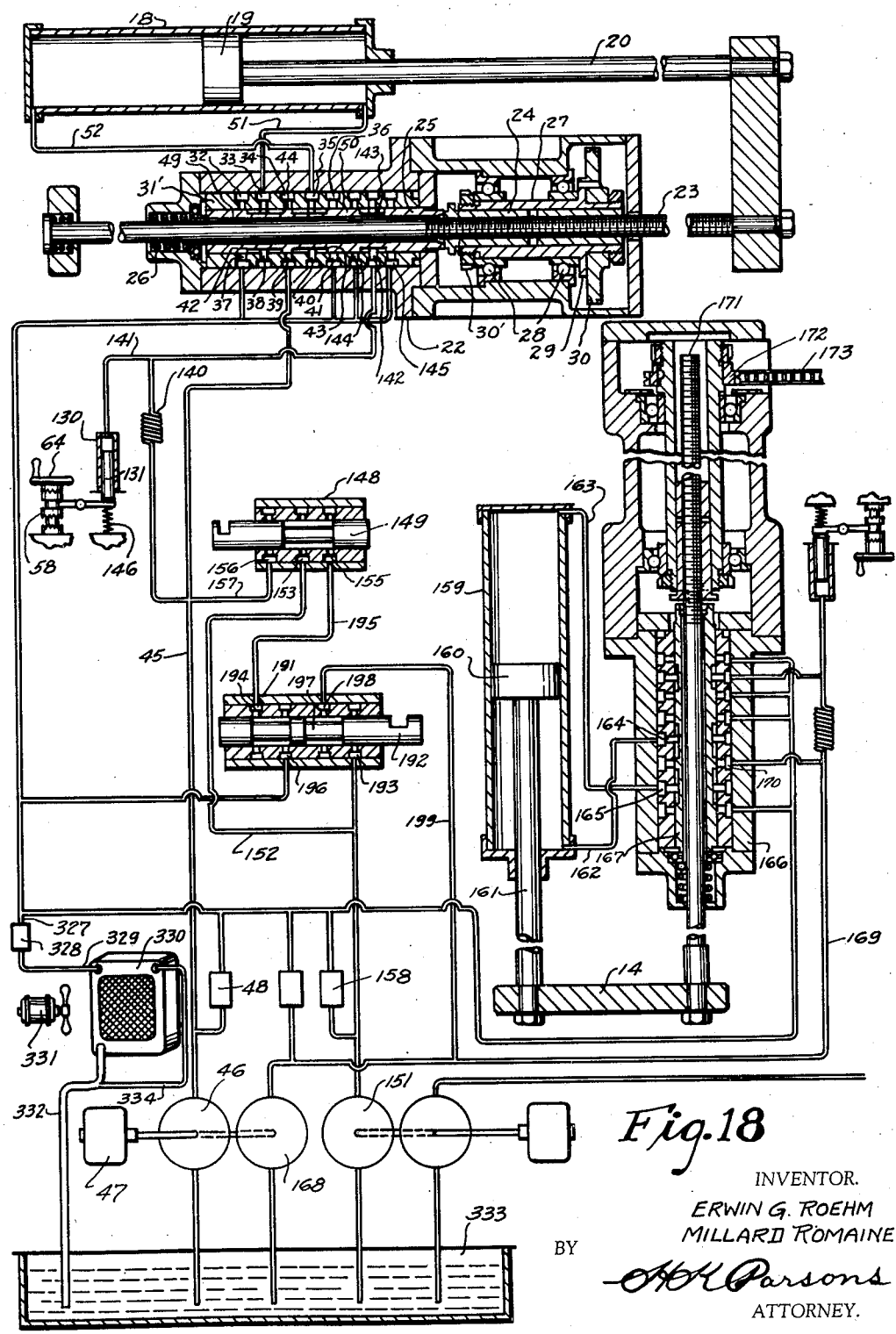
Figure 18 is a diagrammatic view of the table and ram control circuit.

Referring to Figure 18, the lead screw 23 is threaded through a nut 24, which, in turn, abuts the end of the servo-valve plunger 25. A spring 26 is interposed between the other end of the valve plunger and the housing 22 to exert a continuous pressure in one direction to eliminate back lash between the screw and nut, and to cause the valve plunger to follow up any axial movement of the nut.

The nut 24 has a sliding spline connection with a rotatable sleeve 27 supported in anti-friction bearings 28 and these bearings are of the thrust type whereby the sleeve 27 may be securely anchored against longitudinal movement by means of a shoulder 29 formed on one end of the sleeve, and a nut 30 threaded on the other end thereof. The sleeve 27 has keyed thereto a spiral gear 30 which is adapted to intermesh with the spiral gear 31 shown in Figure 7. The lead screw is fixed against rotation whereby it becomes possible upon rotation of the spiral gear 30 to cause the nut 24 to move axially relative to the screw 23 in either direction, depending upon the direction of rotation of the spiral gear 30, and thereby cause movement of the servo-valve plunger in either direction. Movement of the valve plunger will, through hydraulic connections to be described presently, cause introduction of fluid into one end or the other of cylinder 18 and thereby movement of the table. This movement will be imparted to the lead screw 23 and cause repositioning movement of the nut axially relative to the sleeve 27 and in a direction opposite to the direction of movement imparted by rotation of the spiral gear 30 with the result that the servo-valve plunger is repositioned in a direction to stop fluid flow to the cylinder. From the foregoing, it will be seen that the valve plunger and the nut have a limited axial movement in either direction from a central position, regardless of how much movement is imparted to the table, while the lead screw itself follows the movement of the table and therefore must be of a length corresponding to the length of the piston rod 20.

The servo-valve housing 22 has a sleeve 31' fixed therein surrounding the plunger 25 in which is formed a plurality of annular grooves 32, 33, 34, 35 and 36. Each of these annular grooves has radial holes drilled therein which, in effect, form ports 37, 38, 39, 40 and 41. The valve sleeve has annular grooves 42 and 43 formed therein which form an intermediate spool 44 which normally is in a position to close port 39. This port is connected by channel 45 to a constant delivery pump 46, which in turn, is driven by an electric motor 47. The channel 45 has a relief valve 48 therein to prevent excessive pressures building up in channel 45.

The annular grooves 42 and 43 are of such width that the spools 49 and 50 are in a position to close ports 37 and 41, when the spool 44 closes pressure port 39. The ports 38 and 40 are connected by channels 51 and 52 respectively to opposite ends of the cylinder 18, and in such a manner that when the nut is moved in one direction to connect pressure port 39 with one of these channels the fluid will be admitted to that end of the cylinder which will cause the lead screw 23 to move the nut and thereby the valve plunger in an opposite direction to close the pressure port 39. The spiral gear 31 is keyed to a shaft 53 Figure 13 which is journaled in the table apron unit 54 in which is self-contained a mechanism for manually rotating the gear 31, or for power rotating the same, at variable slow rates or at a fast rate. It will be noted that by simply mounting this apron unit in the bed that the spiral gear 31 will be intermeshed with the spiral gear 30.

The shaft 53 is journaled in anti-friction bearings 55 and 56 and has an extension 57 beyond the bearing 56 to which is slideably splined the shiftable clutch member 58. The extension 57 also has a sprocket wheel 59 mounted for free rotation thereon which is interconnected by a sprocket chain 60 to a second sprocket wheel 61. The latter is keyed to a shaft 62 journaled in an adjustable bracket 63 whereby the height of the hand wheel 64, keyed or fixed to shaft 62, may be varied to suit the convenience of the operator.

Figure 6:
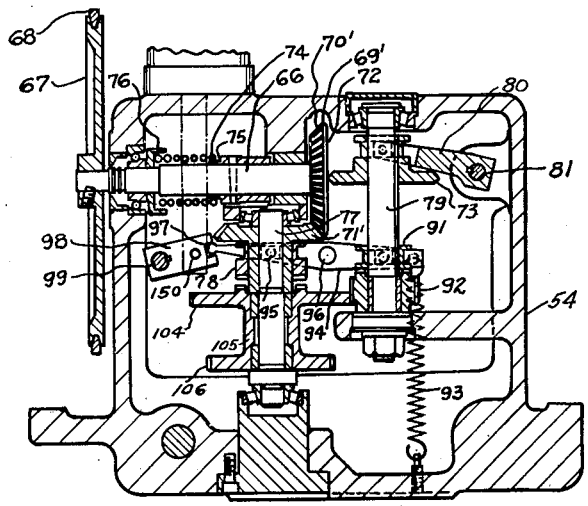
Figure 6 is a section through the table apron unit as viewed on the line 6—6 of Figure 1.

The sprocket wheel 59 has clutch teeth 65 on one face thereof by which it may be connected by the shifter 58 to the shaft 53 whereby the operator may, by rotating the hand wheel 64, effect rotation of the spiral gear 30 which is operatively connected to the servo-valve controlling nut. By means of this mechanism the movement of the table may be manually controlled, and at any rate, depending upon the rate of rotation of the hand wheel 64. The unit 54 also contains a power shaft 66, which, as shown in Figure 6, has a large pulley 67 fixed to the end thereof which may be connected by a belt 68 to a driving pulley 69 fixed to the armature shaft 70 of a prime mover, such as an electric motor 71. Since the pulley 69 is considerably smaller than the pulley 67 a considerable reduction in speed will be effected.

The power shaft 66 has a member 69' secured thereto which has bevel gear teeth 70' formed on the periphery thereof and intermeshing with bevel gear 71'. The member 69' has a friction disc face 72 formed on one side thereof adapted to be engaged by a friction wheel 73. In order to maintain sufficient frictional engagement between the face 72 and the periphery of the wheel 73, the shaft 66 is made free floating and a spring 74 is interposed between a shoulder 75 on the shaft and a fixed abutment 76.

Figure 7:
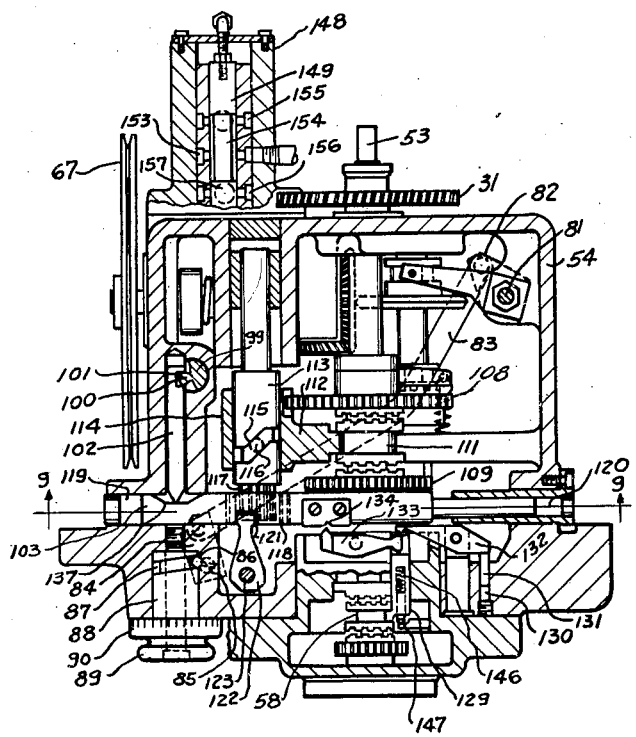
Figure 7 is a section through the table apron unit as viewed on line 7—7 of Figure 1.

The bevel gear 71' is supported on a shaft 77 and has splined on the periphery of its hub a shiftable clutch member 78. Since the bevel gears 71' and 70' are substantially the same size, the bevel gear 71' will be rotated at a relatively high rate of speed. The friction wheel 73 is splined on shaft 79 and is adapted to be moved along the shaft by the shifter fork 80 to vary the radial position of the point of contact of the wheel with the friction face 72 and thereby vary the rate of rotation of the shaft 79. The shifter fork 80 is keyed to the rotatable member 81 which has fixed therewith, as shown in Figure 7, a crank arm 82 connected by link 83 to the crank 84 fixed with shaft 85. The shaft 85 has a ball-ended lever 86 which engages a spiral cam groove 87 formed on the periphery of member 88. This member is adapted to be rotated by the manually operable knob 89 upon the periphery of which are formed graduations 90 to indicate substantially the subsequent rate of feed which will be imparted to the table.

The shaft 79 has a shiftable clutch member 91 splined thereon and adapted to interconnect the shaft 79 with a pinion 92 supported for free rotation on the shaft. A spring 93 is connected to the shifter arm 94 of the clutch member 91 to normally maintain the clutch in driving engagement with the gear 92. The shifter arm 94 also has a connection at 95 with the annular groove formed in the periphery of the clutch member 78 whereby movement of the arm about a pivot 96 intermediate the two clutch members will cause engagement of one clutch and disengagement of the other.

For the purposes herein the clutch member 91 may be considered as the feed control clutch and the clutch 78 the quick traverse control clutch.

The shifter lever 94 has a ball-shaped end 97 engaging a notch formed in the end of crank 98 keyed to shaft 99 whereby the clutches may be alternately engaged by oscillation of shaft 99. As shown in Figure 7, the shaft 99 has a lug 100 engaging a slot 101 formed in the axially shiftable rod 102. The spring 93 normally acts in such a direction as to effect counterclockwise movement of the shaft 99 and thereby a constant pressural engagement between the beveled end of rod 102 and the periphery of the shiftable member 103.

Figure 9:
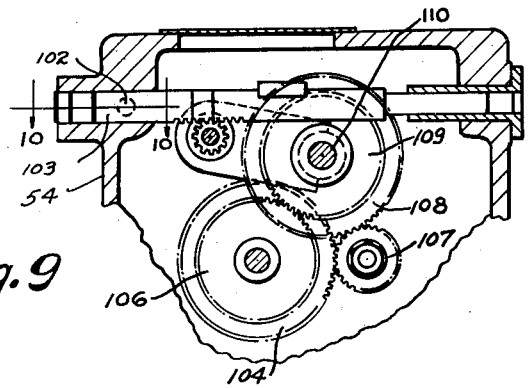
Figure 9 is a section on the line 9—9 of Figure 7.
Figure 10:
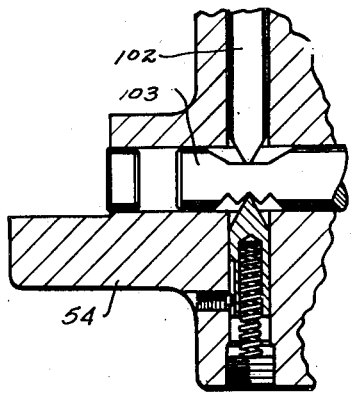
Figure 10 is an enlarged detail of the detent mechanism taken on the line 10—10 of Figure 9.

The pinion 92 intermeshes with the large gear 104 of a couplet 105 which also has a small gear 106. The gear 104, as shown in Figure 9, intermeshes with an idler 107 which, in turn, intermeshes with gear 108, and the gear 106 intermeshes with gear 109. Since the gears 108 and 109 are supported on the same shaft 110 they will be rotated in opposite directions, due to the intermediate idler 107.

The gears 108 and 109 have clutch teeth formed on opposing faces thereto for inter-engagement with the shiftable reversing clutch 111 which is splined on the shaft 110.

Figure 13:
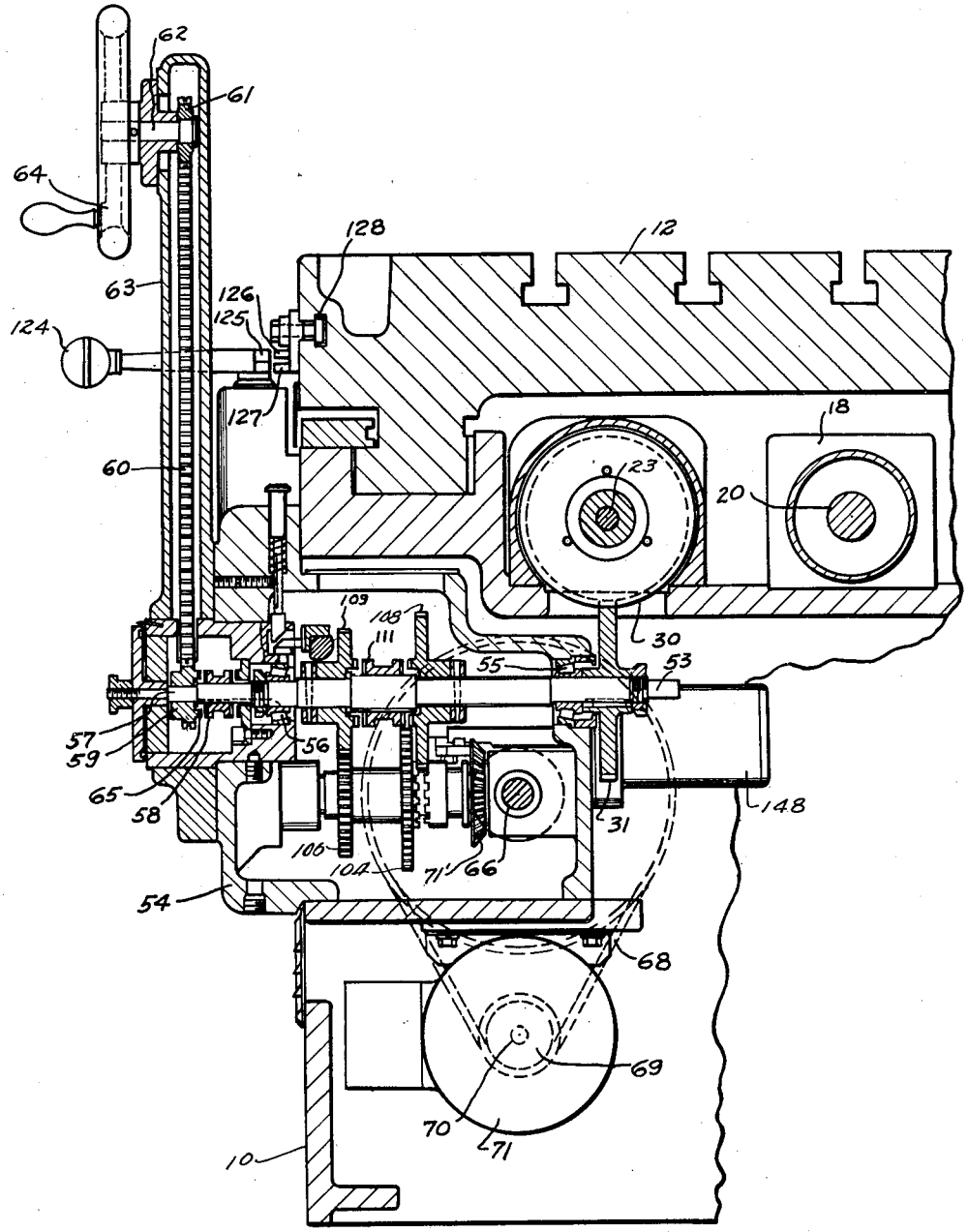
Figure 13 is an enlarged sectional view as viewed on the line 13—13 of Figure 1.

A shifter fork 112 is provided for this clutch and is supported on a rotatable member 113. This member passes through a bore 114 formed in the shifter fork 112 and also has a suitable shaped cam groove 115 into which projects a pin 116 carried by the shifter fork, whereby upon rotation of the member 113 in one direction or the other from the position shown in Figure 7, the reversing clutch 111 will be alternately engaged in driving relation with either gear 108 or 109. As shown in Figure 13, the reversing clutch 111 is splined on the shaft 53, whereby the same may be power rotated at variable feed rates or at a rapid traverse rate, and in either one of two directions, all depending upon the position of clutches 111, 78 and 91.

The position of these three clutches, as well as the position of the clutch 58, are all controlled from a single member which is the member 103. To this end the cam member 113 has gear teeth 117 formed on the end thereof that intermesh with rack teeth 118 formed on the underside of member 103.

Figure 8:
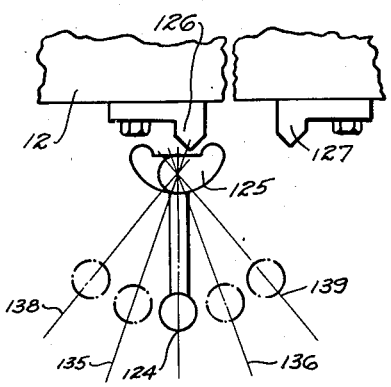
Figure 8 is a plan view showing the various positions of the table trip control lever.

The control member 103 is slideably mounted in bores 119 and 120 formed in the unit 54, and has a notch 121 formed in one side thereof into which fits the ball-ended lever 122 keyed to the control shaft 123. This shaft extends upwardly through the unit and is provided on the top with a manually operable handle 124 which has a suitable shaped portion 125 by which it may be operated by dogs 126 and 127 carried in a T-slot 128 formed in the side of the table. The control lever 124 is utilized for starting and stopping the table, as well as determining the rate and direction of movement thereof. When the lever is in a central position, as shown in Figure 8, the control member 103 is in the position shown in Figure 7, with the result that the reverse clutch 111 is in a neutral position and the feed clutch 91 is engaged. At this time a shifter fork 129 has moved the clutch 58 into engagement with the clutch teeth 65 by reason of hydraulic pressure in cylinder 130 acting through piston 131 and bell crank 132 on the end of member 129. The pivoted detent member 133 which is also operatively connected with the member 129 is moved into engagement with the indent 134 formed in the rod 103 to thereby hold the same against movement while the clutch 58 is engaged for manual movement. This prevents the possibility of the power means being engaged while the mechanism is conditioned for manual operation.

For power operation the lever 124 is rotated to either of the positions indicated by the dash and dot lines 135 and 136 in Figure 8, at which time the interlock detent lever 133 will be rotated in such a direction as to cause the shifter fork 129 to withdraw the clutch 58 from engagement with the clutch teeth 65. Movement of the hand lever 124 to either of the two positions indicated will cause rotation of member 113 and thereby engagement of clutch member 111 with either gear 108 or 109. This movement will not, however, cause any axial movement of member 102 since the bottom of the slot 137 is of sufficient length to permit this. The ends of the slot 137 are beveled, however, so that continued movement of the lever 124 to either the position indicated by the dash and dot line 138 or the one indicated by the line 139 will cause axial movement of member 102 and thereby, through rotation of shaft 99, disengagement of feed clutch 91 and engagement of rapid traverse clutch member 78. Since the spiral groove 115 in member 113 has straight or annular portions at opposite ends of the groove, this movement may be effected without causing further movement of the reverser clutch 111. Thus the control lever 124 has five positions, together with an interlock connection with the manual control clutch 58 whereby this clutch will at all times be disengaged at any time that the control lever 124 is moved to a power operating position.

As shown in Figure 18, the hydraulic interlock cylinder 130 is supplied with fluid pressure from the main supply line 45 through the hydraulic resistance 140, which thereby reduces the unit pressure of the fluid acting on the piston 131. The channel 141 which connects the hydraulic resistance 140 to the cylinder 130 is also connected to port 142 of the servo-control valve and the servo-control valve plunger is provided with an annular groove 143 whereby upon excessive movement of the servo-control valve plunger in either direction, the port 142 will be connected to the drain ports 144 or 145. This will immediately relieve the pressure in cylinder 130 and cause disengagement of clutch 58 through the action of a spring 146 interposed between the shifter fork 129 and a fixed pin 147 projecting into the end of a bore formed in the shifter fork. The object of this is to safeguard against a sudden rapid movement of the hand wheel by the operator.

When the rapid traverse clutch is engaged and the spiral gear 30 is being rotated at a rapid rate, the pump 46 may not have capacity for supplying the cylinder 18 with sufficient fluid to cause the piston and table to accurately follow up the movement of the servo-valve, and means have been provided when the control lever 124 is shifted to a rapid traverse position for supplying additional fluid to the supply line. This means comprises a valve 148 which is attached to the apron unit 54, as shown in Figure 7, in which is mounted a valve plunger 149 which is connected by a pin 150, Figure 6, to the crank arm 98 so that upon movement of this crank arm to engage the rapid traverse clutch, the valve plunger 149 will be shifted to couple a rapid traverse pump 151 through line 152 to the supply line 45. This valve has a port 153 to which the delivery line 152 is connected, and is normally connected by the annular groove in the valve plunger to port 155 which, in turn, is connected to drain whereby the rapid traverse pump will simply be idling during other than rapid traverse movements. When the valve plunger is shifted the port 153 will be connected to port 156, and thereby through branch line 157 to line 45. If desirable, the rapid traverse pump may have a relief valve 158 connected to the delivery side thereof for preventing excessive pressures in the delivery line.

Figures 11, 12:
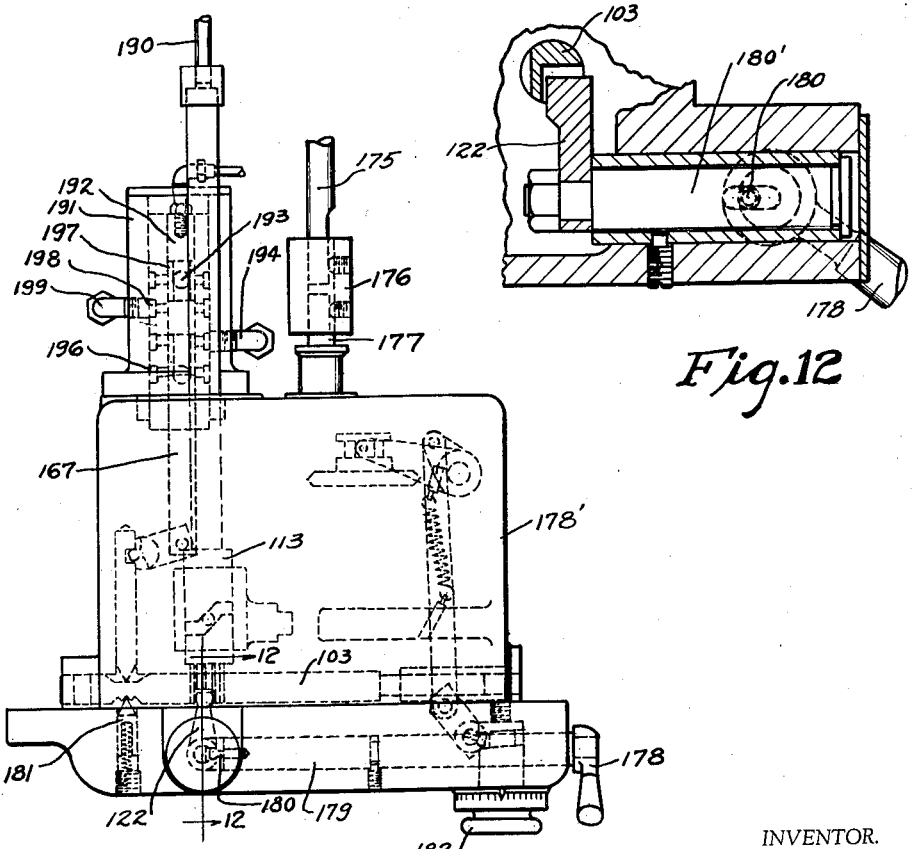
Figure 11 is a plan view of the ram apron unit.
Figure 12 is a section on the line 12—12 of Figure 11.

The mechanism for feeding the ram under manual or power control will now be described. As shown in Figure 5, a cylinder 159 is secured to the bed of the machine, and has mounted therein a piston 160 which is connected by a piston rod 161 to the rear end of the ram 14. This cylinder is connected by channels 162 and 163, as shown in Figure 18, to ports 164 and 165 respectively of a second servo-valve 166 having a plunger 167. This servo-valve is of exactly the same construction as the servo-valve for the table, but is supplied from an independent feed pump 168 which is connected by channel 169 to the pressure port 170 of the valve. A lead screw 171 also passes axially through the valve and extends to the forward end of the ram, that is, adjacent to the carrier mounted thereon where it is provided with a sprocket wheel 172 which is connected by a chain 173 to a sprocket wheel 174 which is more particularly shown in Figure 2 of the drawings. This sprocket wheel is secured to the end of a shaft 175 which passes through the bed 10 of the machine and connected as shown in Figure 11 by a coupling 176 to a shaft 177 which projects from the rear end of the ram apron unit 178'. This unit contains the same feed-rapid traverse drive mechanism and same manual operating mechanism that the table unit previously described contains, and therefore further description thereof is not believed to be necessary. In this unit the lever arm 122 which shifts the control rod 103 is rotated by a hand lever 178 which is connected to the side of the unit rather than on top of it, and the shaft 179 which supports the control lever 178 has an eccentric pin 180, Figure 12, which engages a notch formed in the side of shaft 180' which supports lever 122. A spring operated detent 181 cooperates with a series of notches formed in the side of lever for holding the same in either of its feed positions, but operates in such a manner that the operator must manually hold the parts in either one of its rapid traverse positions.

A rate control knob 182 is located on the right hand side of the unit and operatively connected to the friction disc for varying the feed rate.

As shown in Figure 3, a trip control plunger 183 is rotatably mounted in the bed and projects therefrom in a position adjacent the side of the ram whereby trip dogs 184 and 185 may be secured in a T-slot 186 for trip operation of the plunger. The lower end of the plunger 183 has a crank 187 secured to the end thereof as shown in Figure 20. This lever has a slotted end 188 into which fits a ball-ended lever 189 secured to a rod 190. This rod, as shown in Figure 11, is operatively connected to the end of the rotatable reversing clutch shifting member 113. Since this member is connected by a pinion and rack to the common control member 103 it will be apparent that the trip dogs on the side of the ram may automatically shift the control member 103 to a stop position.

This unit also has a valve 191 containing a shiftable valve plunger 192 which is operatively connected to the common control member 103 for increasing the volumetric supply to the servo-valve when the rapid traverse mechanism is being utilized. This valve has a supply port 193 which is directly connected to the rapid traverse supply pump 151. This valve also has a port 194 which is connected by channel 195 to port 155 of valve 148 for interconnecting port 153 to the drain port 196 whereby when both of these valves are in other than a rapid traverse position the delivery from pump 151 will be by-passed directly to reservoir, thereby insuring that there is no load on the pump except when actually being utilized. When valve plunger 192 is shifted upon movement of member 103 to a rapid traverse position, the supply port 193 will be interconnected by the groove 197 to port 198, which port is connected by channel 199 to the delivery line 169 of the servo-valve.

It will be noted that when either of the valve plungers 149 or 192 is shifted to a rapid traverse position that the by-pass from pump 151 to reservoir will be closed, thereby insuring a rise in pressure in channel 152.

The ram has self-contained therein the entire transmission including a prime mover for rotating the tool spindle 17 and this transmission will now be described, reference being had more particularly to Figure 5. As there shown, a prime mover 200 is mounted upon a support 201 carried by the ram and is connected by a multiple belt drive 202 to a drive pulley 203 which is secured to the primary drive shaft 204 of the variable speed gear box, indicated generally by the reference numeral 205.

The shaft 204 has a first shiftable gear couplet 206 for selectively driving gears 207 and 208, and a second shiftable couplet 209 for selectively driving gears 210 and 211. A second shiftable gear couplet 212 splined on shaft 213 is adapted to be intermeshed with gear 210 or gear 211 whereby shaft 213 may be driven at a total of eight different speeds. The shaft 213 is connected by spur gearing 214 to an output shaft 215 which, in turn, is connected by bevel gearing 216 to a vertical spline shaft 217 located in the forward part of the ram and adjacent the vertical slide 16. This slide carries an integral housing 218 in which is journaled a sleeve pinion 219 for driving through idler 220 the gear 221 keyed to the spindle 17. This pinion has a spline connection with shaft 217, and also has clutch teeth 222 formed on one end thereof. This pinion is journaled in a sleeve 222' which is connected by a pin 223 to a vertically movable shifter 224. The shifter has rack teeth 225 engaged by a pinion 226 whereby rotation of the pinion in a clockwise direction will cause upward movement of the sleeve 222', pinion 219 and also idler 220, this being anti-frictionally journaled on the shifter 224. The result of this is that the idler 220 will be moved out of mesh with gear 221 and clutch teeth 222 will be inter-engaged with clutch teeth 227 formed on the end of sleeve 228 to which is keyed the pulley 229. This pulley is connected by multiple belts 230 to a small pulley 231 keyed to the spindle 17 for driving the same at a higher rate of speed than gear 221.

The pinion 226 is secured to a shaft 232 which projects through the side of the slide 16 and is provided with an operating handle 233, as more particularly shown in Figure 3.

From the foregoing it will be seen that the transmission comprises a variable speed box and two branch transmissions to the spindle, one of which is a step-up or high speed transmission and the other a step-down or relatively lower speed transmission.

Due to the large amount of mechanism carried by the vertical slide the same may be counterbalanced by a weight 234 which is connected by a chain 235 passing over sprocket wheels 236 and 237 to the vertical slide 16. It will be noted that all this mechanism is self-contained in the ram.

The slide 16 may be moved up and down by a servo-motor mechanism comprising a cylinder 238, Figures 3 and 16, which is fixed for movement with the vertical carrier, and has a contained piston 239 connected by a piston rod 240 to the top of the ram whereby the piston and piston rod are stationary and the cylinder is the movable member. This cylinder is connected by channels 241 and 242 to ports 243 and 244 formed in a plate 245 attached to the side of the ram. When the machine is utilized for plain milling operations a second plate 246 is bolted to the first plate having channels therein which interconnect ports 243 and 244 to ports 247 and 248, as more particularly shown in Figure 17. These ports are connected respectively by channels 249 and 250 to ports 251 and 252 of a servo-valve 253. This valve has a pressure port 254 connected by channel 255 to a supply pump 256 whereby upon movement of the valve plunger 257 of the servo-valve the pressure port may be alternately connected to ports 251 and 252. This valve also has a pair of exhaust ports 258 and 259 for alternately connecting ports 251 and 252 to reservoir in such a manner that when one is supplied with pressure the other will be connected to exhaust.

The servo-valve plunger has a lead screw 260 integrally connected therewith and threaded through a fixed nut 261 whereby upon rotation of the screw the valve plunger will be moved axially in one direction or the other, causing admittance of fluid pressure to the vertical cylinder 238; and movement of the cylinder will, in turn, impart movement to the valve housing 253 which is integrally connected with the vertical slide to cause repositioning of the valve plunger and stoppage of the movement.

A gear 262 is mounted in the vertical slide in coaxial relation to the screw 260 and supported by a thrust bearing 263 in such a manner that a spring 264 is interposed between the gear and the valve plunger to exert a constant thrust thereon in a direction to take out any backlash between the screw and the nut 261. A sliding joint 265 is provided between the shaft 266 to which the gear 262 is keyed and the end of the valve plunger whereby the same may be moved relative to the gear 262.

The shaft 266 has a bevel gear 267 on the lower end thereof intermeshing with a bevel gear 268 keyed to shaft 269 which has a hand wheel 270 fixed to one end thereof and located in a position convenient for operation by the attendant, as more particularly shown in Figure 1. The shaft 269 is extended and connected by bevel gear 271 to a second shaft 272 which projects from the other side of the carrier and is provided with an operating handle 273. From Figure 1 it will be noted that these hand wheels are in such spaced relation that the operator may conveniently control the movement of the vertical slide from either end of the table.

Means have been provided whereby the operator may accurately determine the amount of vertical movement of the carrier and this means comprises a scale 274, which, as shown in Figure 14, is directly secured to the carrier 16 for movement therewith. A member 275 carrying a reference mark 276 is secured to a vertically extending member 277 which, as shown in Figure 3, is fixedly secured to a member 278 which overhangs from the top of the ram 14. From this it will be seen that the reference mark 276 remains stationary while the scale 274 moves relative thereto.

If it is desired to have the lead screw 260 power rotated a detachable power bracket 279 may be applied to the carrier. The power bracket carries mechanism for power rotating screw 260 through the gear 262. This gear is adapted to intermesh with gear 280, shown in Figure 15, upon application of the bracket to the vertical carrier. The gear 280 is keyed to shaft 281 upon which is splined the shiftable clutch member 282. Mounted for free rotation upon this shaft is a pair of bevel gears 283 and 284 which intermesh with bevel gear 285 secured to the end of shaft 286. This shaft is driven through friction rate change mechanism 287 from the prime mover 288 in a manner similar to that described in connection with the table drive mechanism. A control knob 289 serves to vary the position of the friction disc 287.

The reversing clutch 282 has a shifter fork 290 attached to a shifter rod 291. This shifter rod has a notch 292 formed therein in which fits a pin 293 eccentrically located in the shaft 294, whereby rotation of the shaft by the manually operable handle 295 will effect upward or downward movement of the shifter rod and thereby engagement of the clutch with one or the other of the bevel gears 284 or 283.

The shifter rod 291 may also be trip controlled by means of a trip lever 296 secured to the end of the oscillatable shaft 297 which also has an eccentric pin 298 located in the end thereof and interfitting in the notch 299 formed in the shifter rod. The shaft 297 has a detent plate 300 in which are formed three notches adapted to be engaged by the spring pressed detent 301' which serves to hold the shifter rod 291 in any one of its three positions.

The trip lever has two fingers 301 and 302 which lie in different planes and are adapted to be selectively engaged by dogs 303 and 304 which may be directly attached to a T-slot 305 formed in the member 277 or attached to a rotatable dog carrying member 306 which may be pivotally mounted at opposite ends in brackets 307 attached to the member 277.

It will be noted that the dog 304 projects out further than the dog 303, the reason for which is that this dog will engage the end of the indicator dial plunger 308 whereby after the dog has moved past the trip member to automatically stop the movement the slide may be manually adjusted by hand a slight additional amount which may be measured by the reading of the indicator dial 309 which is operatively connected to the plunger 308.

When it is desired to use the machine as a tracer controlled machine for profiling or diesinking an additional bracket 310 is applied to the power bracket and bolted on the face 311 as shown in Figure 15. This bracket contains an interlock control valve 312, shown in Figure 16, and a hydraulic motor 313 and a tracer head unit 314. The connections of these various valves are automatically effected by removing the plate 246 and substituting therefor the plate 279. The interlock valve 312 serves to automatically connect the tracer control valve 314 to the cylinder 238 whereby the tracer will automatically control the up and down movement of the head. When the tracer is undeflected the valve plunger 315 will be automatically shifted to the left from the position shown to thereby interconnect the servo-control valve 253 for control of the cylinder 238. The particular manner of operation of this valve and the connections thereto are more fully described in co-pending United States application 30,744, filed July 10, 1935, and further description thereof is not believed to be necessary.

The bracket 310 carries a vertically adjustable slide 316 upon which is formed a dove-tailed guideway 317 for receiving a horizontal adjustable slide 318. The tracer head 314 is longitudinally adjustable in an elongated slot formed in the member 318 and may be clamped in any longitudinal position therein. By this construction it is possible to adjust the tracer finger 319 in any one of three directions relative to the table 12, which thereby eliminates the necessity of accurately positioning the pattern on the table relative to the tracer finger. In other words, the work may be properly located with respect to the cutting tool 320 attached to the spindle 17 and the pattern secured to the work table 12 after which the finger 319 may be accurately adjusted through easily movable parts to position the tracer finger 319 in the same relation relative to the pattern that the cutter 320 bears to the work piece.

With this setup the ram and table may be manually or power moved to guide the tracer 19 from the pattern in any direction desired and the vertical movement will be automatically taken care of by the tracer.

By means of additional attachments certain profiling operations may be carried out by the use of a narrow plate cam whereby a surface many times wider than the plate cam may be produced with the same profile, thereby eliminating the necessity for making a wide pattern. For example, a narrow plate cam 321 may be attached to the side of the bed as by bolts 322, as more particularly shown in Figure 4, and the tracer finger 319 aligned with this cam. If now the table is held stationary and the ram 14 moved back and forth it will be apparent that the cutter will be moved up and down to reproduce the profile of the cam. After one stroke of the ram in either direction the table 12 may be indexed longitudinally and the operation repeated. By this means any length of surface may be reproduced with the same profile as the cam 321.

Figure 4:
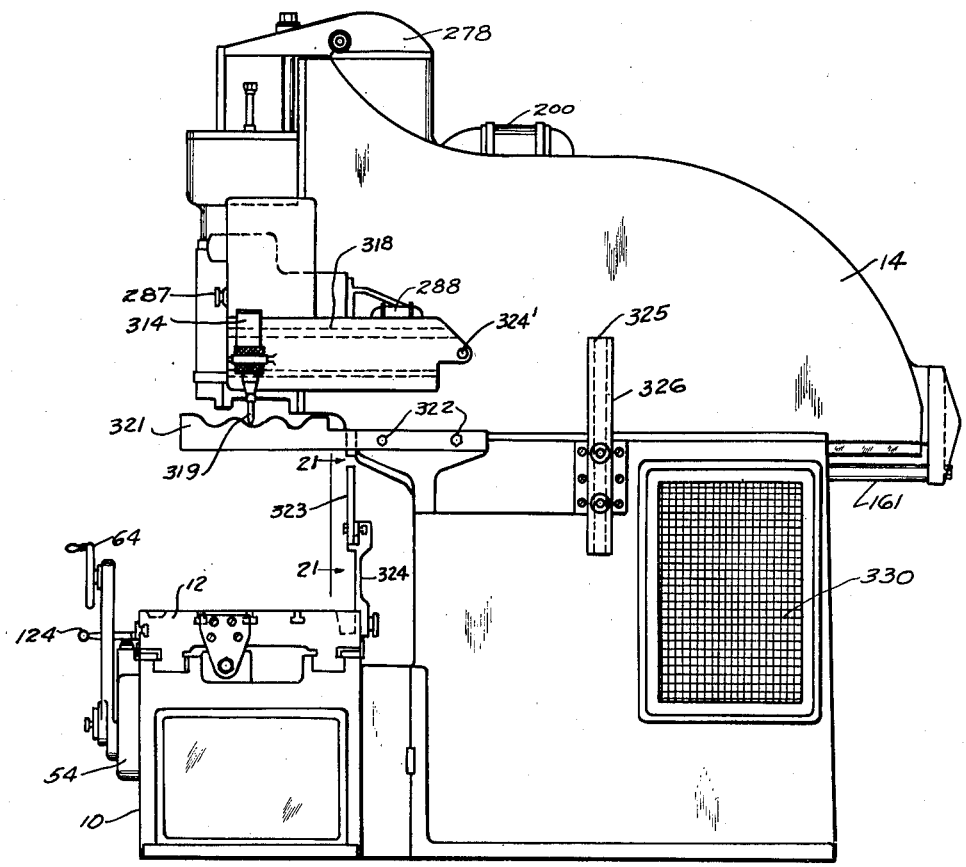
Figure 4 is an elevation of the machine shown in Figure 1 as viewed from the right side thereof.
Figure 21:
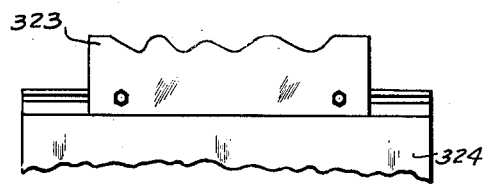
Figure 21 is a detail view on the line 21—21 of Figure 4.

In a similar manner a plate cam 323 may be attached to the bracket 324 on the edge of the table and the ram 14 moved to the rear from the position shown in Figure 4 until the tracer finger 319 engages the top surface of the cam 323. In this case a roller 324' secured to the rear of member 318 is engaged in a slot 325 formed in a vertically adjustable member 326 which is clamped to the bed to hold the member 318 from movement in a horizontal plane. Due to the fact that the member 318 is mounted in the dove-tail guideway 317 it may be held against movement while the ram 14 is adjusted forwardly and backwardly. In other words, the part 316 will be the moving part and the part 318 will be the stationary part. With this setup the table is traversed and the cutter will reproduce the profile of the cam 323 and after one stroke the ram 14 indexed in one direction or the other, and a second stroke effected. This may be carried out as many times as desirable whereby a surface considerably wider than the thickness of the cam 323 may be given a profile similar to the profile on the cam 323.

Attention is invited to the fact that all the return lines of the machine join 327 and pass through a low pressure check 328 which is just sufficient to keep all lines filled with oil. This check valve is connected by channel 329 to a large radiator 330 located in the bed of the machine as shown in Figure 4. An electric fan 331 may be mounted inside the machine to maintain a continuous circulation of air through the radiator.

A return pipe 332 connects the bottom of the radiator to the reservoir 333. An overflow pipe 334 may be connected through an independent connection to the top of the radiator to pipe 332.

There has thus been provided an improved machine for the purposes disclosed.

We claim:

1. In a milling machine having a cutter and a work table movable transversely thereof, the combination of transmission mechanism therefor including a cylinder and piston, one of which is connected to the table, a source of fluid pressure, a valve for controlling the flow of fluid pressure to said cylinder including a fixed part and a movable part, power operable means for effecting relative movement between the parts at variable slow rates, or at a relatively fast rate, means to selectively connect said power operable means for said actuation including a shiftable member, and valve means operable by said member when shifted to its fast rate position for coupling an additional source of fluid pressure to the first-named valve.

2. In a milling machine having a tool support and a work support, the combination of a transmission mechanism for effecting relative movement between the supports including a final rotor, power operable means for actuating said rotor at feed rates or at a relatively quick traverse rate including a feed-quick traverse selector, a direction determinator including a shiftable member having a third position for stopping the table, a single control lever for both of said determinators having five positions including a central or stop position, a feed left and a feed right position upon opposite sides of said central position, a quick traverse left and a quick traverse right position upon opposite sides of said central position and beyond said feed positions, trip operable means for moving the control lever from either of said feed positions to a stop position, manually operable means for positioning the lever in either of its quick traverse positions, and means automatically operable for returning the lever to one of said feed positions upon release by the operator.

3. In a milling machine having a tool support and a work support, the combination of power operable means for effecting relative movement between the supports comprising a servo-motor mechanism including a servo-valve plunger having a central position, an actuator for moving said plunger from its central position, a manually operable part, means including a selector member for operatively coupling the manually operable part to said actuator whereby said plunger may be moved, means responsive to the moving part for continuously returning said plunger to its central position, and means responsive to an excessive movement of said plunger from its central position to automatically disconnect said manually operable member.

4. In a milling machine having a bed with table guideways formed thereon, a table movable in said guideways and a tool support, the combination of means for moving said table including a cylinder and piston supported by the bed between said guideways, means connecting one of said parts to the table, a servo-valve supported by the bed between said guideways for controlling the admission of fluid to said cylinder including a plunger, means including a gear coaxial with said plunger for shifting the same to cause admission of fluid pressure to said cylinder, an operative connection with said table for shifting said plunger in a direction to stop admission of fluid pressure to said cylinder, and a bracket including manual and power operable means for actuating said gear, said bracket including a final member interengageable with the first-named gear upon assembly of the bracket with said bed.

5. In a milling machine having a work support and a tool support, the combination of means for effecting movement of one of said supports toward and from the other including a servo-motor mechanism including a servo-valve having a control plunger, dual manually operable controls carried by the movable slide for actuating said plunger and a detachable power bracket connectible to said slide for power actuation of said plunger.

6. In a milling machine having a work support and a tool support, the combination of means for effecting movement of one of said supports toward and from the other including a slide, power operable means for moving said slide, a bracket detachably connectible to the slide and including power operable means for controlling the rate of slide movement, and a second detachable unit supported by the first detachable unit and including additional means for controlling the movement of said slide.

7. In a machine tool of the class described, the combination of a tool support and a work support, a tool spindle carried by the tool support, a tracer arm, means to support the tracer arm on the tool support with its axis parallel to the axis of the tool spindle including a plurality of superimposed subsupports, and means to adjust said subsupports in directions lying in planes either parallel to or perpendicular to the axis of the tool spindle whereby the tracer arm may be adjusted in a plurality of directions relative to the tool spindle while maintaining its parallelism therewith.

8. In a hand die-sinking machine, the combination of a pair of relatively movable members mounted in guideways having their axes lying in planes normal to one another, means to support a cutting tool on one of said slides and a work piece on the other slide, separate power operable means including manual controls therefor for governing the operation of each slide, a tracer control mechanism carried by one of said slides and having a tracer arm adapted to engage a pattern carried by the other slide, and means controlled by the tracer for automatically governing relative movement between the slides in a third direction and during manual control of the other two directions of movements.

9. In a hand die-sinking machine, the combination of a pair of relatively movable members mounted in guideways having their axes lying in planes normal to one another, means to support a cutting tool on one of said slides and a work piece on the other slide, separate power operable means for moving each slide, a tracer controlled mechanism carried by one of said slides having a tracer arm adapted to engage a pattern carried by the other slide, means controlled by the tracer for controlling relative movement between the slides in a direction normal to both of said guideways, and power operable controlled means for governing the rate of operation of each of said first-named power operable means whereby the movable members may be automatically moved in their respective guideways and the tracer will control the position of the tool in a direction normal to the plane of said guideways.

10. In a pattern controlled machine tool having a work support and a tool support, power operable means for effecting relative movement between the supports in one direction, a tracer mounted on one of said supports, a plate cam supported to lie in a plane parallel to the direction of said movement whereby during a single cutting stroke the relative movement between the tool and work support will take place in accordance with the profile of said cam, and means to effect a relative indexing movement between the tool support and work support while maintaining the same relative positon between the tracer and cam.

11. In a profiling machine, the combination of a work support and a ram movable in paths normal to one another, a tracer carried by the ram for engagement with a pattern mounted on the table, power operable means controlled by the tracer for governing movement of the tool toward and from the table during movement thereof, a plate cam carried by the table for engagement with the tracer, means to index the ram and means to hold the tracer in the plane of said cam during said indexing movement.

12. In a pattern controlled machine tool, the combination of a table and a ram supported for movement in paths lying in planes normal to one another, a cutting tool, a carrier for supporting the cutting tool for vertical movement on the ram, a tracer mounted on the carrier and having a tracing arm, a plate cam, means to fixedly support the cam in a plane parallel to the direction of ram movement, power operable means for moving the ram and thereby the tool transversely to the table, and means to index the table after each stroke of the ram whereby a surface wider than the thickness of the cam may be produced with a profile which is the same as the profile of the cam.

13. In a machine tool having a work support and a tool support, the combination of a bed, guideways formed thereon for receiving said supports, independent fluid operable means for moving said supports including a common fluid reservoir, independent pumps for supplying each of said circuits with fluid from said reservoir, a common return line for collecting the exhaust fluid from all of said circuits, a radiator having a connection to said return line, a second connection from said radiator to said reservoir, and means in the machine for maintaining a constant circulation of air through said radiator.

14. In a milling machine having a table and a servo-motor mechanism for moving the table including a control valve, the combination with a source of fluid pressure connected to said valve, of a pair of power operable members, one of which is driven at a fast rate and the other at a plurality of slower rates, means including a shifter to selectively connect either of said power operable members for actuation of said servo-valve, and valve means automatically operable by said shifter when one of said members is connected for actuation of said control valve for connecting an additional source of fluid pressure to said control valve.

15. In a hand die-sinking machine, the combination of a pair of relatively movable members mounted in guideways having their axes lying in planes normal to one another, a cutting tool mounted on one of said members, and means to support a work piece and a pattern on the other, a tracer supported for engagement of said pattern, servo-motor means operatively connected for effecting relative movement between said members universally in one plane including a pair of manual controls respectively connected to said servo-motor mechanisms, one of which is adapted to control movement in one direction in said plane and the other in a second direction in said plane.

16. In a hand die-sinking machine, the combination of a pair of relatively movable members mounted in guideways having their axes lying in planes normal to one another, a cutting tool mounted on one of said members, and means to support a work piece and a pattern on the other, a tracer supported for engagement of said pattern, servo-motor means operatively connected for effecting relative movement between said members universally in one plane including a pair of manual controls respectively connected to said servo-motor mechanisms, one of which is adapted to control movement in one direction in said plane and the other in a second direction in said plane, and means controlled by the tracer while in contact with the pattern for controlling relative movement between the tool and the work in a direction perpendicular to said plane.

17. In a pattern controlled machine tool, the combination with a tool support and a work support, the latter of which is adapted to receive a work piece and a pattern, of a tool spindle mounted on the tool support with its axis perpendicular to the work support, a tracer arm, a plurality of superadjacent subsupports for supporting the tracer arm on the tool support with its axis parallel to the axis of the tool spindle, and means to adjust said subsupports whereby the tracer may be positioned in the same relation to a given point on the pattern that the tool spindle bears with respect to a corresponding point on the work.

18. In a pattern controlled machine tool, the combination of a bed, a first slide mounted on the bed for carrying a work piece and a pattern, a ram slidably mounted on the bed for carrying a tool and a tracer, means for controlling movement of the ram and slide including individual servo-motor mechanisms, individual manual controls carried by the bed and adjacent the edge of said slide for manually controlling each of said servo-motor mechanisms, means for supporting said tool and tracer for vertical movement toward and from said slide, and power operable means for controlling said vertical movement by the tracer during manual manipulation of the ram and slide.

ERWIN G. ROEHM.
MILLARD ROMAINE.